United States Patent
Niedermair

(10) Patent No.: US 7,980,266 B2
(45) Date of Patent: Jul. 19, 2011

(54) SOFFIT VENT

(75) Inventor: Siegfried Niedermair, Sharon (CA)

(73) Assignee: Dundas Jafine Inc., Brampton, Ontario (CA)

( * ) Notice: Subject to any disclaimer, the term of this patent is extended or adjusted under 35 U.S.C. 154(b) by 797 days.

(21) Appl. No.: 11/671,189

(22) Filed: Feb. 5, 2007

(65) Prior Publication Data

US 2008/0185055 A1 Aug. 7, 2008

(51) Int. Cl.
 *F16K 15/06* (2006.01)
(52) U.S. Cl. ............... 137/516.17; 137/540; 137/543.15
(58) Field of Classification Search .................. 137/511, 137/528, 535, 357, 358, 359, 360, 516.15, 137/516.16, 516.23, 543.15, 220, 516.13–516.19, 137/536, 540, 542, 543, 513.13–513.23; 454/350, 353, 354, 359; 54/94, 95; 285/4
See application file for complete search history.

(56) References Cited

U.S. PATENT DOCUMENTS

| | | | | |
|---|---|---|---|---|
| 178,224 A * | 6/1876 | Adams | ...................... | 137/543.15 |
| 910,711 A * | 1/1909 | McCarty | .................. | 137/543.23 |
| 1,404,130 A * | 1/1922 | Leinert | .................... | 137/516.13 |
| 1,470,625 A * | 10/1923 | Jones | ........................ | 137/516.21 |
| 1,695,069 A * | 12/1928 | Tuttle | ........................ | 137/516.13 |
| 1,971,171 A * | 8/1934 | Bebbington | ............. | 137/516.13 |
| 2,170,478 A * | 8/1939 | Long et al. | ................. | 137/514.3 |
| 2,501,744 A * | 3/1950 | Seligmann | ............... | 137/516.13 |
| 2,809,660 A * | 10/1957 | Becker | ........................ | 137/514.3 |
| 3,866,950 A * | 2/1975 | Skoch et al. | ....................... | 285/4 |
| 4,007,758 A * | 2/1977 | Gray et al. | .................... | 137/472 |
| 4,116,212 A * | 9/1978 | Cooper | ......................... | 137/220 |
| 4,408,629 A * | 10/1983 | Lafont | ..................... | 137/329.04 |
| 4,911,196 A * | 3/1990 | Kemp | ........................... | 137/220 |
| 5,167,578 A | 12/1992 | Legault | | |
| 5,692,955 A | 12/1997 | Meyer | | |
| 5,711,091 A | 1/1998 | Bos | | |
| 5,762,551 A | 6/1998 | Lachapelle et al. | | |
| 6,149,516 A | 11/2000 | Mantyla | | |
| 6,286,880 B1* | 9/2001 | Pratt | .......................... | 294/68.25 |
| 2005/0155645 A1* | 7/2005 | Freudendahl | .............. | 137/68.14 |
| 2006/0102240 A1* | 5/2006 | Spiegl et al. | .................. | 137/855 |

* cited by examiner

*Primary Examiner* — John Rivell
*Assistant Examiner* — MaCade Brown

(57) ABSTRACT

A one-way soffit vent has an upstream valve seat and a downstream vented cover having a boss extending in the upstream direction. A valve disk is reciprocally mounted on the boss and biased against the valve seat.

20 Claims, 5 Drawing Sheets

SOFFIT VENT

BACKGROUND

This invention relates to a soffit vent.

Bathrooms, kitchens, and other enclosures in homes and other buildings often have exhaust fans to actively vent these enclosures. Ductwork typically extends between the fan and the outside of the building. One place for the outlet of the ducting which, as compared with a wall or the roof of a building, may minimize the cost of installation, is the soffits. Air blown by the fan should, of course, exit the home; however, it is desirable to avoid back drafts, especially in cold weather. It is also desirable to block the migration of vermin or insects into the home through the ducting. In an effort to achieve these goals, U.S. Pat. No. 6,149,516 to Mantyla discloses a soffit vent at the outlet of the ducting which has a weighted flapper valve that will close when the fan is off.

This invention seeks to provide an improved soffit vent.

SUMMARY OF INVENTION

A one-way soffit vent has an upstream valve seat and a downstream vented cover having a boss extending in the upstream direction. A valve disk is reciprocally mounted on the boss and biased against the valve seat.

Other features and advantages of the invention will become apparent from the following description in conjunction with the drawings.

DESCRIPTION OF THE DRAWINGS

In the figures which illustrate example embodiments of the invention.

DETAILED DESCRIPTION

Figure 1:
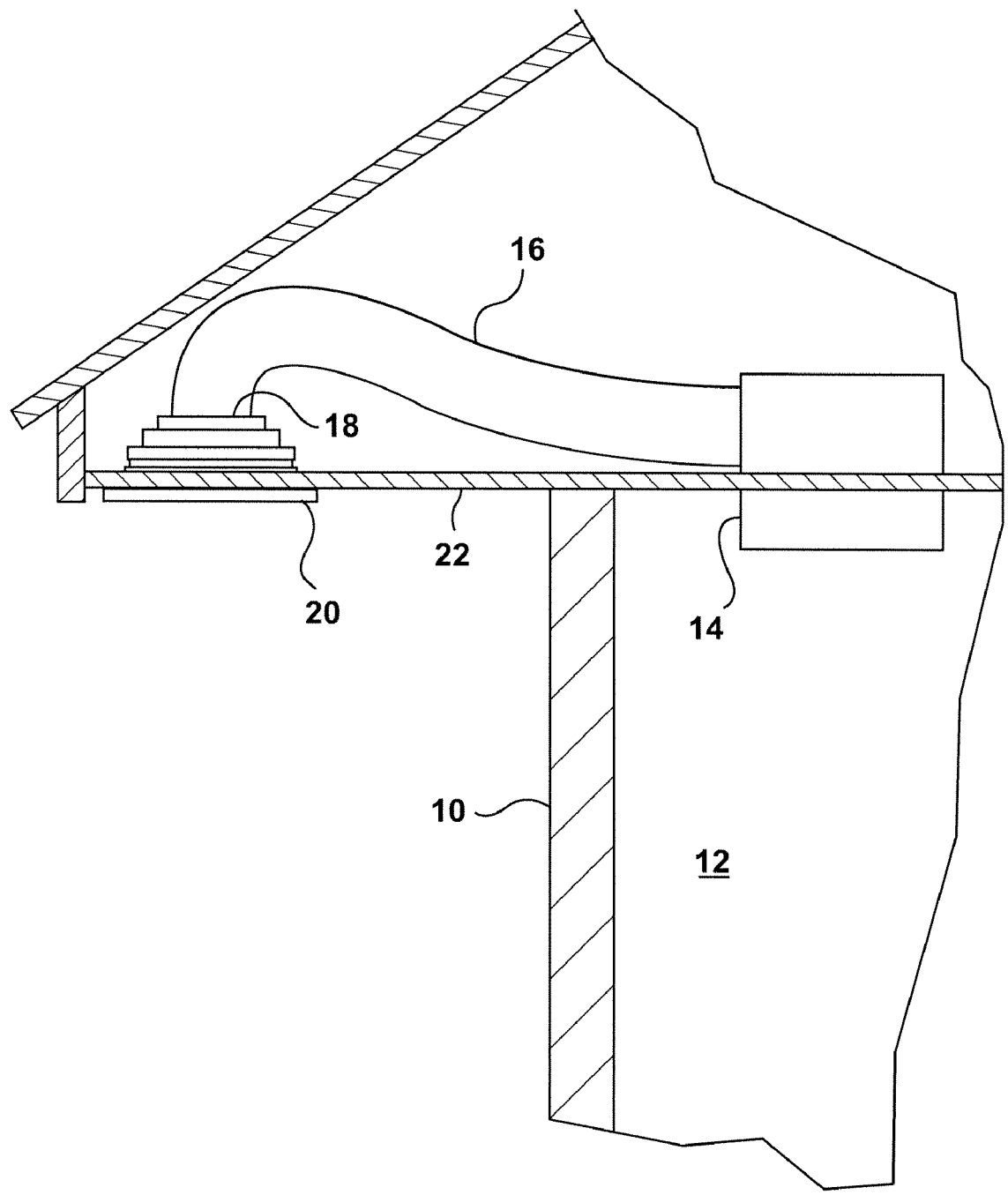
FIG. 1 is a side schematic view of a vented enclosure of a building using a soffit vent according to this invention.

Turning to FIG. 1, a building 10 has an enclosed room 12 with an exhaust fan 14 in the ceiling. The outlet of the exhaust fan is connected to one end of a duct 16; the other end of the duct is connected, by hose clamp 18, to the upstream end of soffit vent 20. As seen in FIG. 1, the soffit vent is mounted through the soffit 22 of the building.

Figure 2:
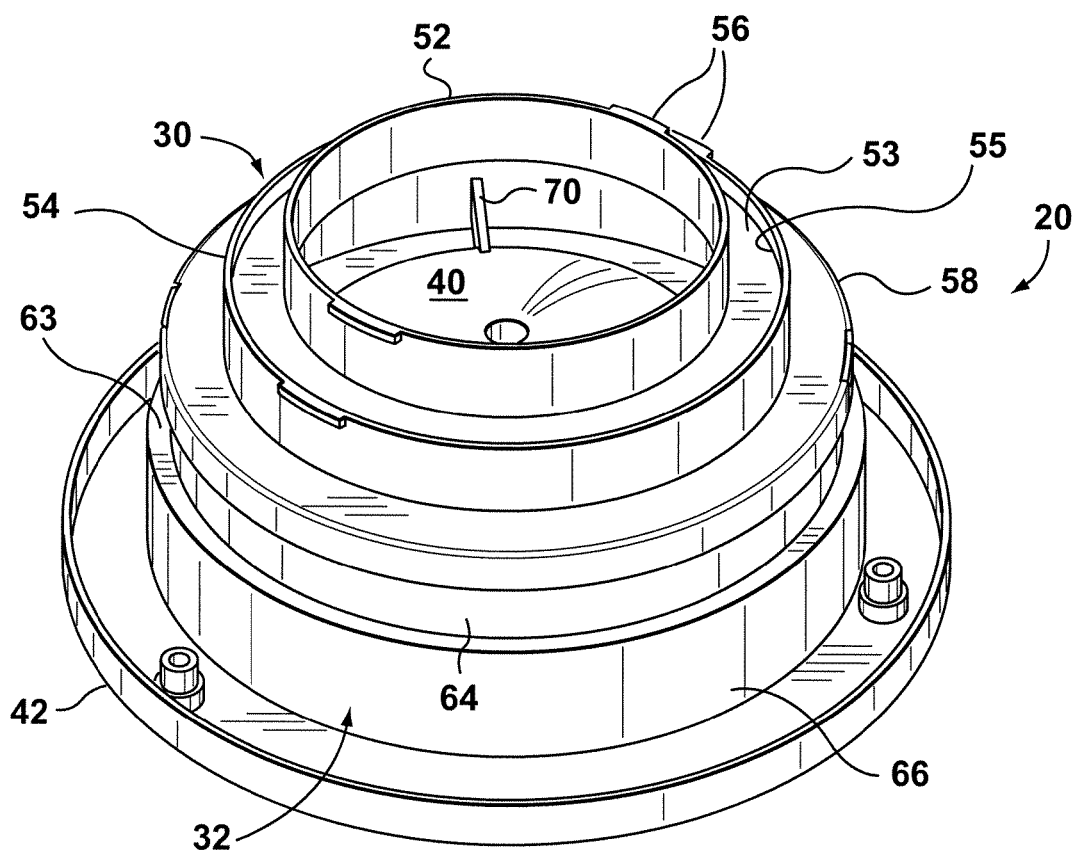
FIG. 2 is a top perspective view of a soffit vent according to this invention.
Figure 3:
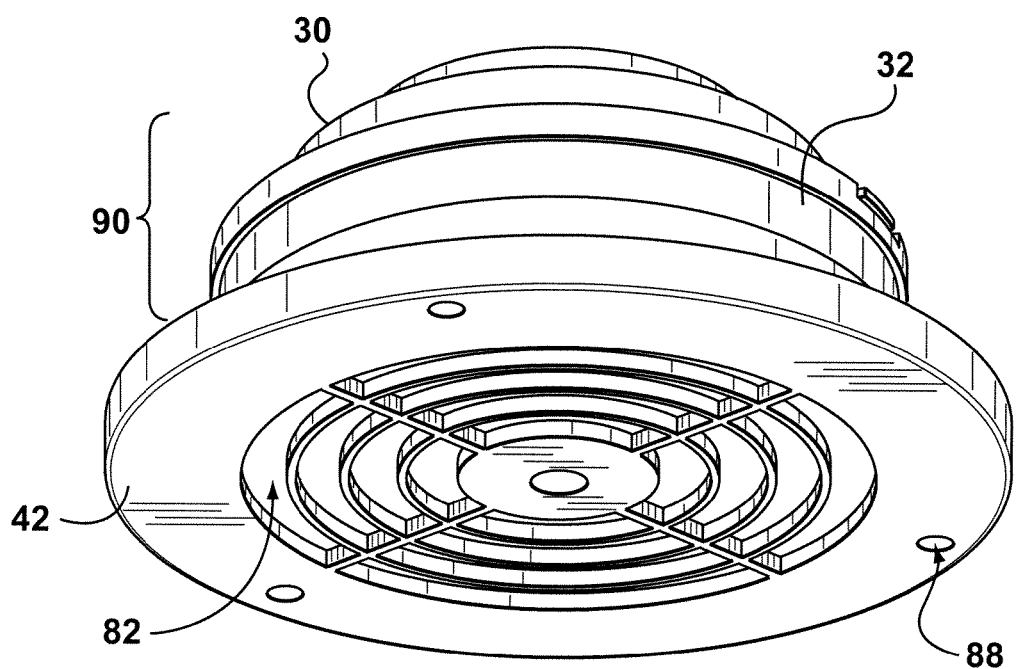
FIG. 3 is a bottom perspective view of the soffit vent of FIG. 2.
Figure 4:
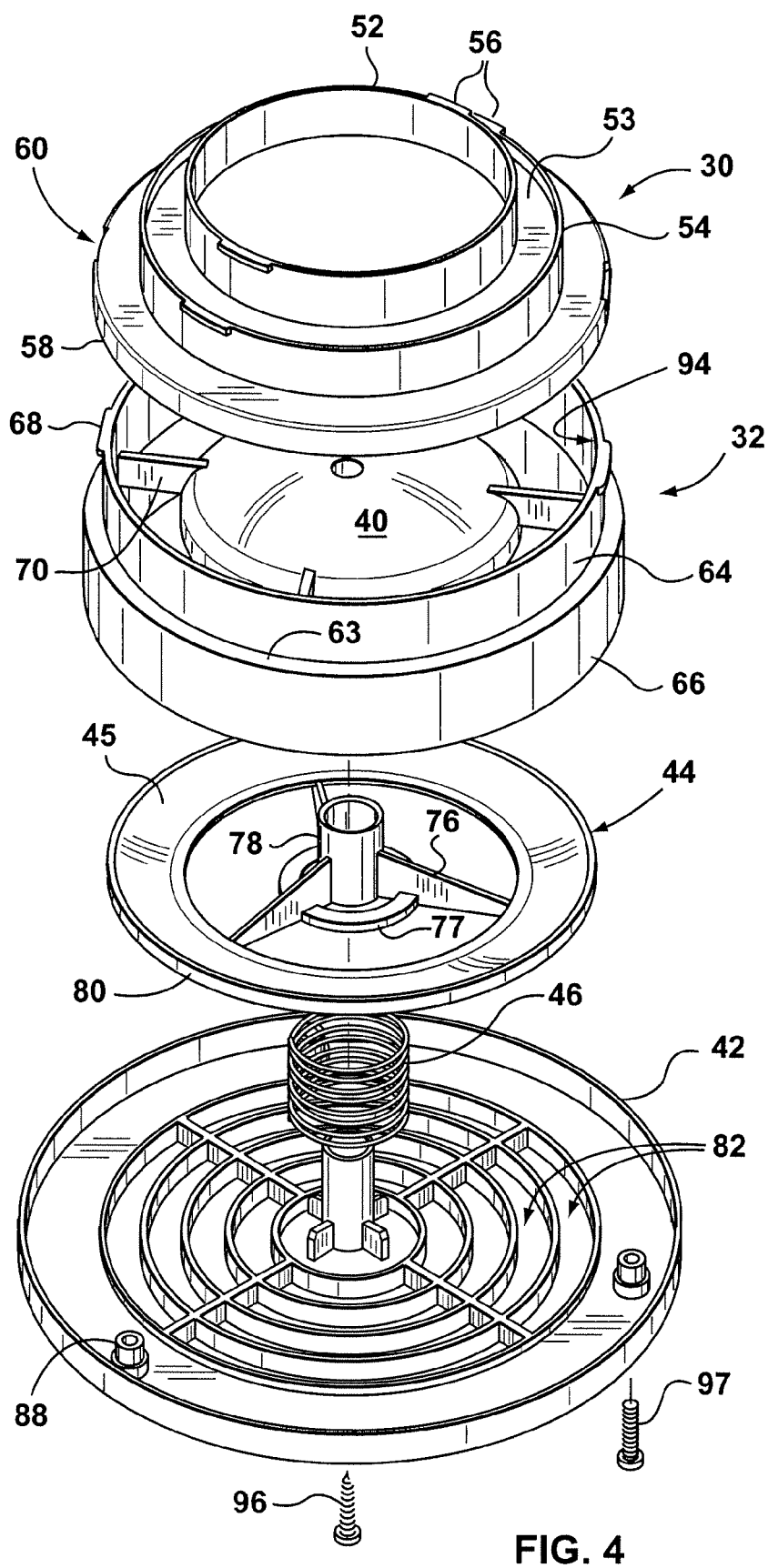
FIG. 4 is an exploded view of the soffit vent of FIG. 2.

Soffit vent 20 is detailed in FIGS. 2 to 4. Turning to these figures, the vent may have, in downstream order, a first sleeve section 30, a second sleeve section 32 which is connected to a valve seat 40, and a cover 42. A valve disk 44 and a coil spring 46 may extend within the second sleeve section 32 upstream of the cover 42.

The first sleeve section 30 may have an upstream smaller diameter cylindrical stub 52 terminating at a step runner 53 to a larger diameter concentric downstream cylindrical stub 54. Each cylindrical stub 52, 54 may have a pair of outwardly projecting tabs 56. The first sleeve section 30 may step outwardly again to a cylindrical base 58 with a pair of mounting notches 60.

The second sleeve section 32 may have a smaller diameter upstream cylindrical stub 64 terminating at a step runner 63 to a larger diameter downstream cylindrical stub 66. The upstream stub 64 may have a pair of mounting tabs 68. The valve seat 40 may be connected to the smaller diameter upstream cylindrical stub 64 of the second sleeve section by a web 70 which comprises four radially projecting arms. The valve seat may be a dome-shaped shell with the top of the dome-shape extending in the upstream direction. An annular cylindrical finger 72 (FIG. 5) may depend from the valve seat 40 and project downstream to a blind end with a central threaded opening.

Valve disk 44 may have an annular portion 45 and a central web 76 which connects the annular portion to a central spring backstop 77 and an annular mounting cylinder 78. The valve disk 44 may have a peripheral wall 80. The radial distance to inner surface 94 of the cylindrical stub 64 of the second sleeve section 32 is chosen to be slightly greater than the radius of the valve disk 44 defined by the outer surface of peripheral wall 80.

Valve cover 42 may have vent openings 82 and a central annular boss 84 which extends in the upstream direction and is internally divided by a radial wall 86 (FIG. 5) with a central opening. The cover 42 may have number of fastener receiving openings 88 proximate its periphery.

To assemble vent 20, mounting tabs 68 of the second sleeve section 32 may be snapped into the mounting holes 60 of the first sleeve section 30 to form a completed outer sleeve 90. Spring 46 may be dropped over boss 84 and the annular mounting cylinder 78 of valve disk 44 may be slid over the boss 84 such that an end of the spring 46 abuts spring backstop 77. Next, the outer sleeve 90 may be oriented so that the annular finger 72 of the valve seat is received by the opening in the boss 84 of cover 42. A screw 96 may then be inserted through the opening in radial wall 86 of the boss and threaded to the threaded opening of the blind end of the finger 72 of valve seat 40 to hold the assembly together.

Figure 5:
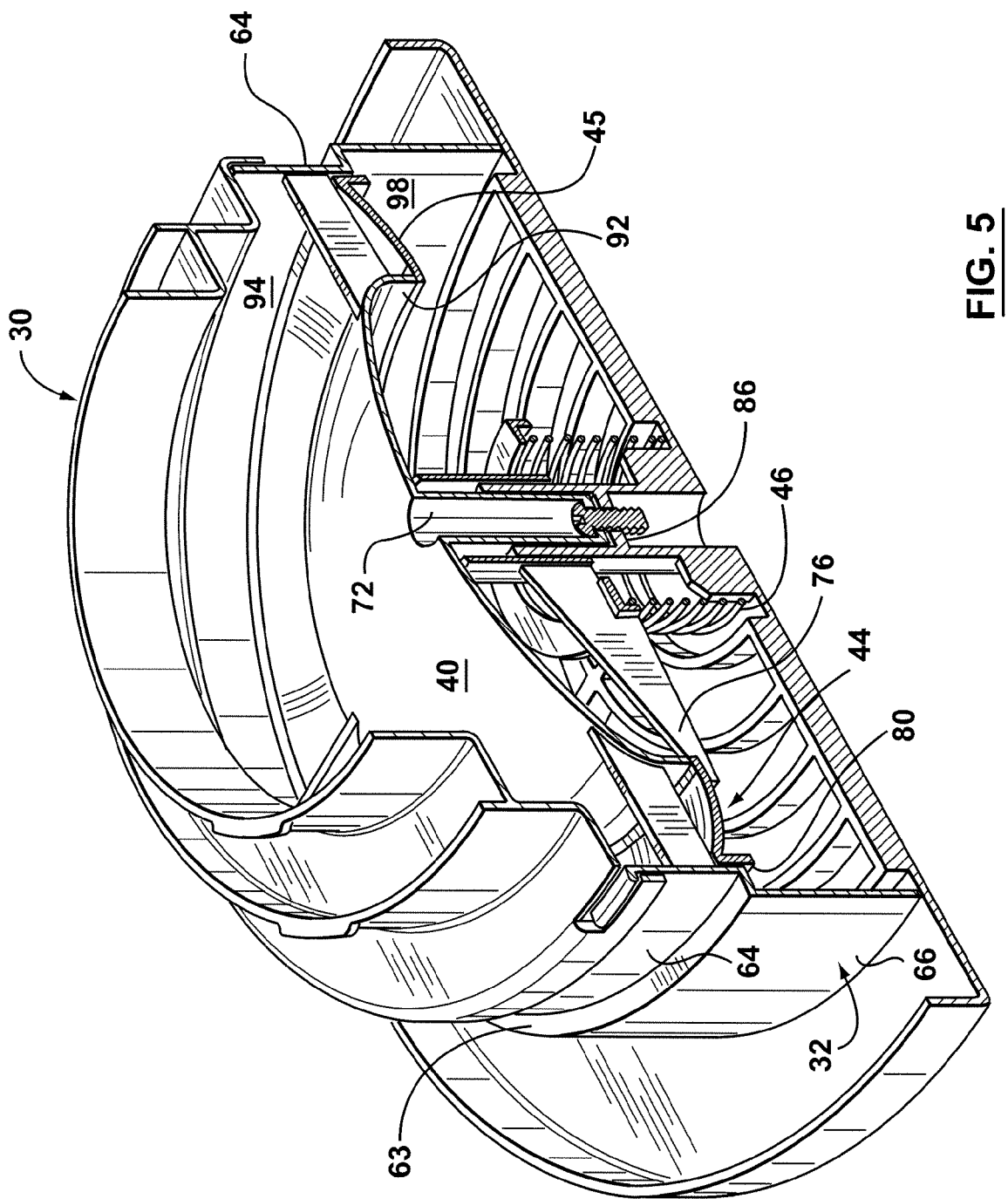
FIG. 5 is a cross-sectional view of the soffit vent of FIG. 2 showing the vent closed.

The result is detailed in FIG. 5. Spring 46 urges valve disk 44 in an upstream direction to seat against valve seat 40. Specifically, the annular portion 45 of the valve disk may abut the downstream edge of the lip 92 of the dome-shaped shell of the valve seat 40. When in this seated position, around the entire periphery of the valve disk, the outer surface of the wall 80 of the valve disk faces the inner surface 94 of the cylindrical stub 64 of the second sleeve section 32 at a small stand-off. Thus, the valve disk, when seated against the valve seat 40 effectively seals off the opening through the vent 20.

Referencing FIG. 1 along with FIGS. 2 to 4, the outer sleeve 90 of soffit vent 20 may be inserted through a soffit 22 of a building 10 and fasteners 97 (FIG. 4) screwed into the soffit wall through fastener receiving openings 88 in order to secure the vent cover 42 to the soffit. A smaller diameter duct 16 (e.g., a 4" diameter duct) may fit snugly around the smaller diameter cylindrical stub 52. A hose clamp 18 may then be fitted around the end of the duct between the step runner 53 and the tabs 56 of stub 52 and tightened to clamp the end of the duct to the soffit vent. If, instead, a larger (e.g., 5") diameter duct were to be used, then the smaller diameter cylindrical stub 52 could be removed and the duct clamped to the larger diameter stub 54. The step runner 53 may be provided with a line of weakness 55 to facilitate removal of stub 52. Further, if an even larger diameter duct (e.g., a 6" diameter duct) were to be used, then the entire first sleeve section 30 could be demounted from the second sleeve section 32 and the duct clamped to cylindrical stub 64 of the second sleeve section with a hose clamp extending between runner 63 and mounting tabs 68. In this instance, the second sleeve section itself acts as the outer sleeve.

Figure 6:
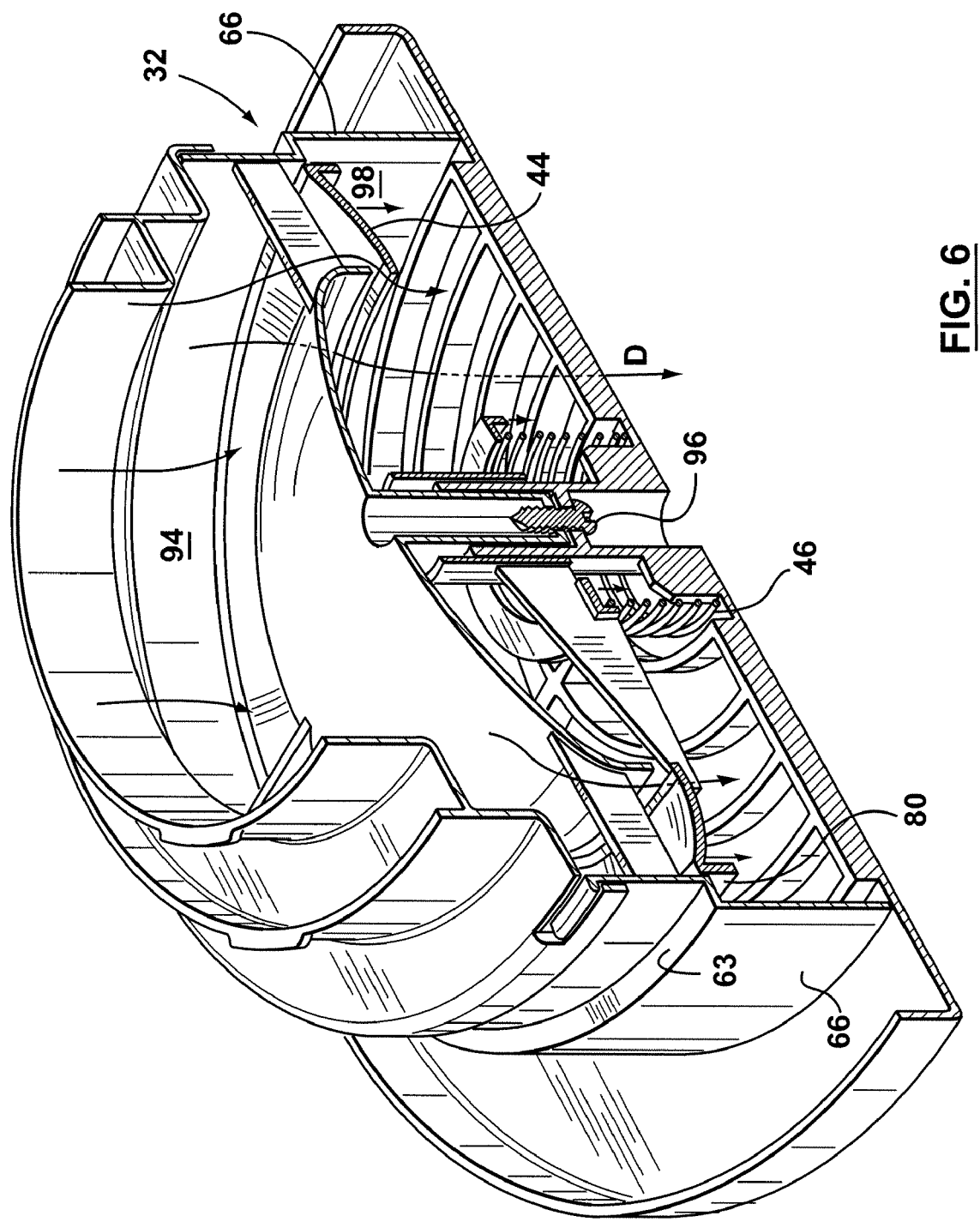
FIG. 6 is a cross-sectional view of the soffit vent of FIG. 2 showing the vent open.

After installation, when the fan 14 is not running, the valve disk 44 will be seated against the valve seat 40, such that the valve defined by the various parts is closed. Any back draft will then simply serve to more firmly seat the valve disk against the valve seat, thus keeping outdoor air out. On the other hand, when the fan 14 is turned on, as seen in FIG. 6, air moves in a downstream direction, D, and the pressure of the exhausting air will push on the valve disk and overcome the biasing force of spring 46 to cause the valve disk 44 to unseat from the valve seat 40. Air then exhausts through the vent. The valve cover 42 and valve disk 44 present two separate barriers against bugs and vermin entering the ducting system.

In a cold climate, moisture in inside air may condense out as the air is exhausted. This may cause ice build-up on surfaces of vent 20 and, in particular, on inner surface 98 of larger diameter downstream cylindrical stub 66 of sleeve section 32. The outward step to this stub 66 provides a clearance between wall 80 of valve disk 44 and inner surface 98. Section 32 may be designed so that this clearance is sufficient to ensure any such ice build-up does not interfere with the movement of the valve disk 44.

Many modifications will be apparent to those skilled in the art. For example, the first sleeve section 30 could have only a single cylindrical stub for mounting to a duct, or it could have more than two different diameter stubs. The two sleeve sections could instead be molded as one continuous outer sleeve, or these sections could be joined in some convenient fashion other than the tab and notch configuration described. The valve seat 44 need not have a dome-shaped shell, however the dome-shape has the advantage of reducing the turbulence of exhausting air over many other shapes that could be contemplated. (Air turbulence varies the pressure on the valve disk which could result in the valve disk rattling on the valve seat.) Indeed, at least for warmer climates, the runner 63 of the step in the second cylindrical section could function as the valve seat and the valve disk could be a solid disk, rather than an annulus, which seated against this step runner 63. The biasing coil spring 46 could be replaced by a series of coil springs, or by one or more springs of a different type, acting between the vent cover and the valve disk.

Other modifications will be apparent to those skilled in the art and, therefore, the invention is defined in the claims.

What is claimed is:

1. A one-way soffit vent, comprising:
   an outer sleeve;
   an upstream valve seat having a central dome-shaped section with a top of said dome-shaped section extending in an upstream direction, said dome shaped section connected to said outer sleeve by a plurality of ribs to provide a flow path between said dome-shaped section and said sleeve;
   a downstream vented cover having a boss extending in said upstream direction;
   a valve member reciprocally mounted on said boss and biased against said valve seat,
   wherein said dome-shaped section of said valve seat is mounted to said boss.

2. A one-way soffit vent, comprising:
   an outer sleeve;
   an upstream valve seat having a central dome-shaped section with a top of said dome-shaped section extending in an upstream direction, said dome shaped section connected to said outer sleeve by a plurality of ribs to provide a flow path between said dome-shaped section and said sleeve;
   a downstream vented cover having a boss extending in said upstream direction;
   a valve member reciprocally mounted on said boss and biased against said valve seat, wherein said boss is annular with an inner radially extending wall having an opening, and wherein said valve seat has a finger projecting in a downstream direction with a blind end with an opening.

3. The vent of claim 2 further comprising a fastener projecting through said opening in said inner radially extending wall and said opening in said blind end to join said vented cover to said valve seat.

4. The vent of claim 3 wherein one of said opening in said inner radially extending wall and said opening in said blind end is threaded.

5. The vent of claim 4 further comprising a coil spring extending about said boss for biasing said valve member against said valve seat.

6. A one-way soffit vent, comprising:
   an outer sleeve;
   an upstream valve seat having a central section with a dome-shaped surface with a top of said dome-shaped surface extending in an upstream direction, said central section connected to said outer sleeve by a plurality of ribs to provide a flow path between an outer periphery of said central section and said sleeve, said dome-shaped surface arranged for deflecting air flowing downstream toward said outer periphery and into said flow path;
   a downstream vented cover having a boss extending in said upstream direction;
   a valve member reciprocally mounted on said boss and biased toward a seated position against said valve seat, said valve member configured so that said flow path is closed off when said valve member is in said seated position against said valve seat
   wherein said valve member comprises a peripheral band, said peripheral band extending between said outer sleeve and an outer periphery of said central section of said valve seat so as to block said flow path when said valve member is seated against said valve seat.

7. The vent of claim 6 wherein said outer sleeve extends between said vented cover and an upstream end of said vent, said sleeve having at least one cylindrical stub extending on an upstream side of said valve seat for mounting to a duct.

8. The vent of claim 7 wherein said sleeve has at least two concentric cylindrical stubs, each for mounting to a different diameter duct.

9. The vent of claim 8 further comprising a coil spring extending about said boss for biasing said valve member against said valve seat.

10. The vent of claim 8 wherein said vented cover has a plurality of fastener receiving openings.

11. The vent of claim 9 wherein said valve seat is mounted to said boss.

12. The vent of claim 8 wherein said sleeve comprises a first sleeve section having an upstream smaller diameter cylindrical stub and a second sleeve section having an upstream larger cylindrical stub, said first sleeve section removably mounted to said larger diameter cylindrical stub of a second sleeve section.

13. The vent of claim 12 wherein said first sleeve section has an intermediate diameter cylindrical stub disposed downstream of said smaller diameter cylindrical stub.

14. The vent of claim 13 further comprising a line of weakness between said smaller diameter cylindrical stub and said intermediate diameter cylindrical stub for facilitating removal of said smaller diameter cylindrical stub prior to mounting said duct to said intermediate diameter cylindrical stub.

15. The vent of claim 7 wherein an inner surface of said sleeve defines an opening and wherein, when said valve member is seated against said valve seat, an outermost surface of said valve member, about an entire periphery of said valve member, faces said inner surface of said sleeve.

16. The vent of claim 15 wherein said sleeve has a cylindrical inner surface at said valve seat with a first radius and said valve member has a circular outline with a second radius less than said first radius.

17. The vent of claim 16 wherein said sleeve has an outwardly directed step positioned such that when said valve member lifts off said valve seat, said outermost surface of said valve member faces said inner surface of said sleeve downstream of said step.

18. The vent of claim 6 wherein said peripheral band is sloped such that an outer periphery of said band is upstream of an inner periphery of said band.

19. The vent of claim 18 wherein said peripheral band of said valve member is annular.

20. The vent of claim 18 wherein said valve member further comprises a central portion mounted on said boss and a web connecting said central portion to said peripheral band.

* * * * *